United States Patent [19]

Pointing et al.

[11] 4,313,278

[45] Feb. 2, 1982

[54] MUSHROOM GROWING

[75] Inventors: Roy A. W. Pointing, Wokingham; Richard A. Rucklidge, Angmering, both of England

[73] Assignee: W. Darlington & Sons Limited, Hayes, England

[21] Appl. No.: 59,429

[22] Filed: Jul. 20, 1979

[30] Foreign Application Priority Data

Jul. 28, 1978 [GB] United Kingdom ............ 31452/78

[51] Int. Cl.³ .............................................. A01G 1/04
[52] U.S. Cl. ........................................ 47/1.1; 47/82
[58] Field of Search ............... 47/66, 1.1, 82–83, 47/59

[56] References Cited

U.S. PATENT DOCUMENTS

| | | | |
|---|---|---|---|
| 2,300,983 | 11/1942 | Sleighter | 47/1.1 X |
| 3,063,196 | 11/1962 | Pauer | 47/82 |
| 3,286,398 | 11/1966 | Stengel | 47/1.1 |
| 4,059,922 | 11/1977 | DiGiacinto | 47/82 |
| 4,075,785 | 2/1978 | Jones | 47/82 X |
| 4,118,892 | 10/1978 | Nakamura et al. | 47/66 |

FOREIGN PATENT DOCUMENTS

| | | | |
|---|---|---|---|
| 830661 | 8/1938 | France | 47/1.1 |
| 203356 | 3/1939 | Switzerland | 47/1.1 |
| 224379 | 11/1942 | Switzerland | 47/1.1 |
| 474210 | 6/1969 | Switzerland | 47/83 |

*Primary Examiner*—Robert E. Bagwill
*Attorney, Agent, or Firm*—Sughrue, Mion, Zinn, Macpeak and Seas

[57] ABSTRACT

A mushroom growing method and apparatus in which a tray is filled with compost mixed with mushroom spawn, and the compost is covered with a layer of casing medium. The tray is supported horizontally while the mycelium colonizes the casing medium, and is then supported in an upright disposition under mushroom growing conditions so that the mushrooms grow from the upright face of the consolidated casing medium. Two trays may be supported back-to-back in an upright disposition against a stanchion. Alternatively, the trays may be hinged together and lifted to rest against each other back-to-back. The casing medium layer is watered by wicks dipping into water containers.

16 Claims, 11 Drawing Figures

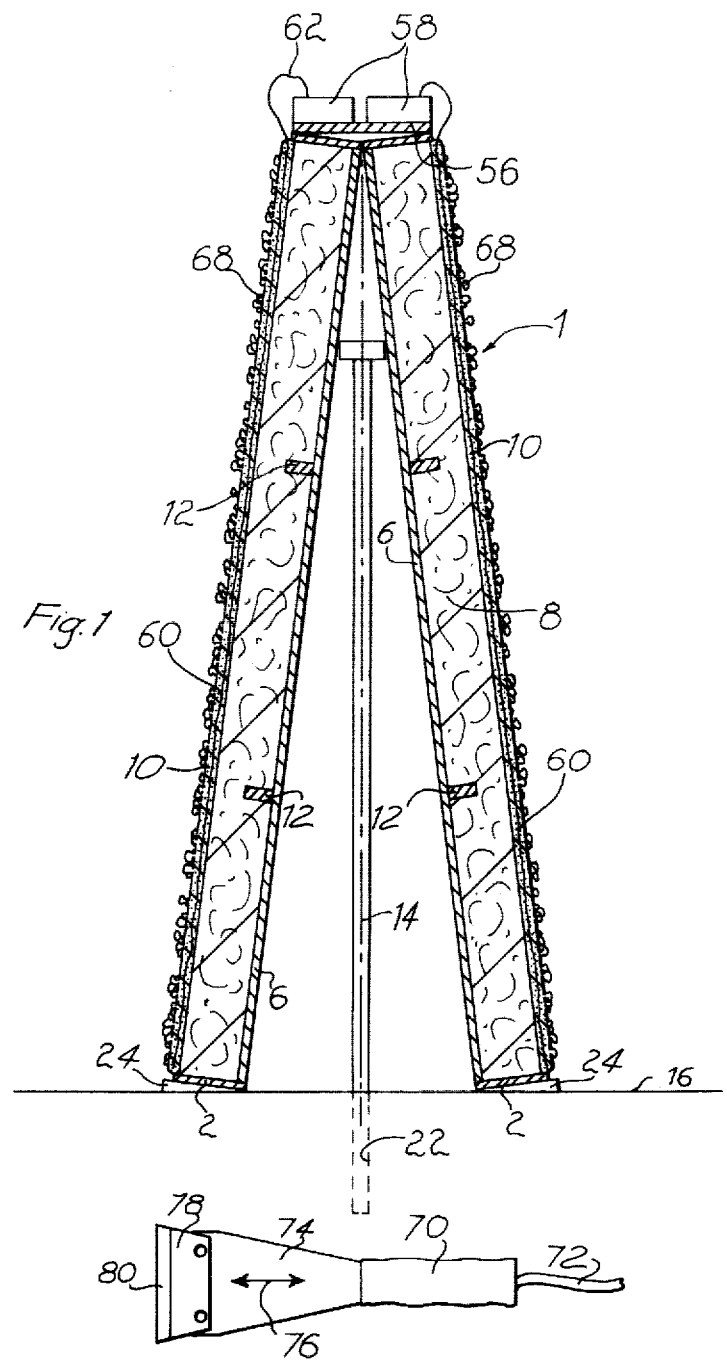

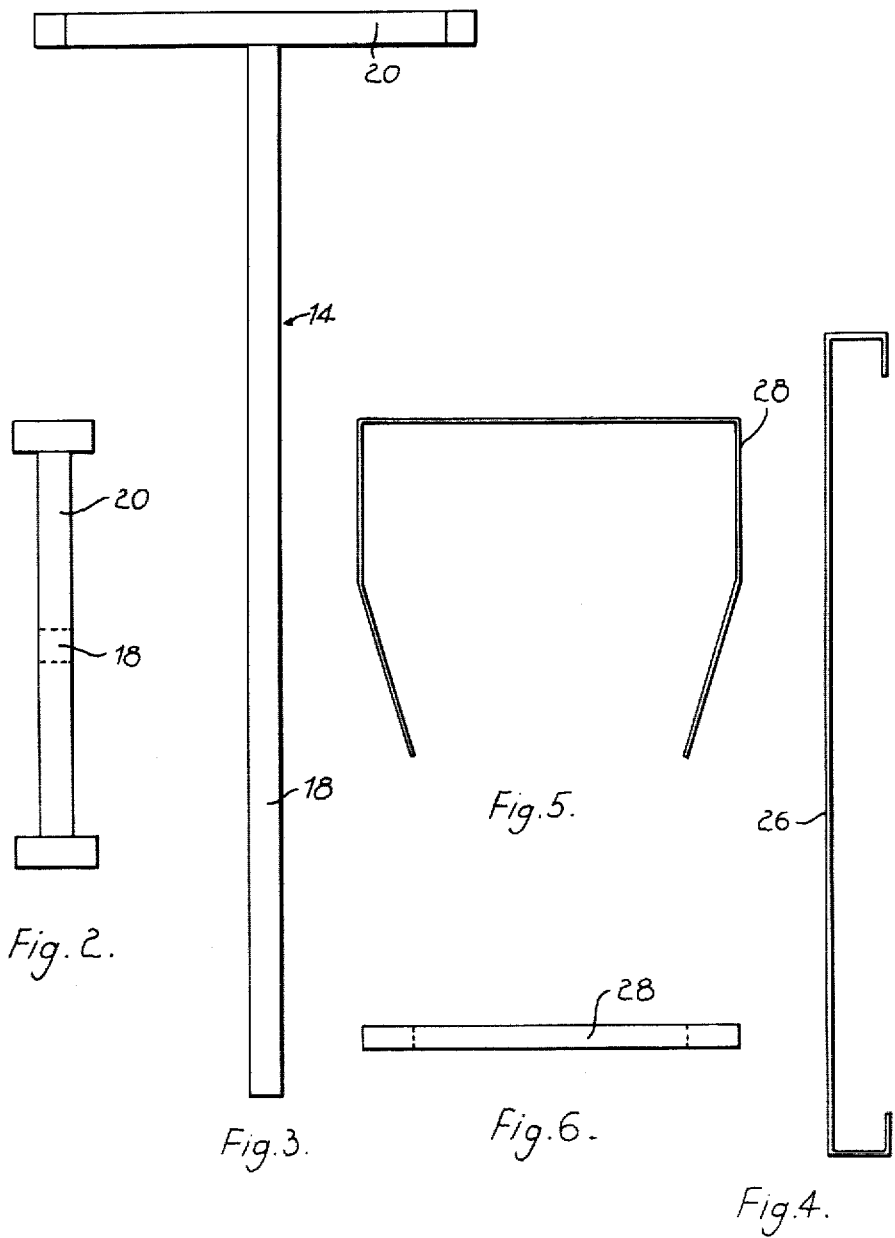

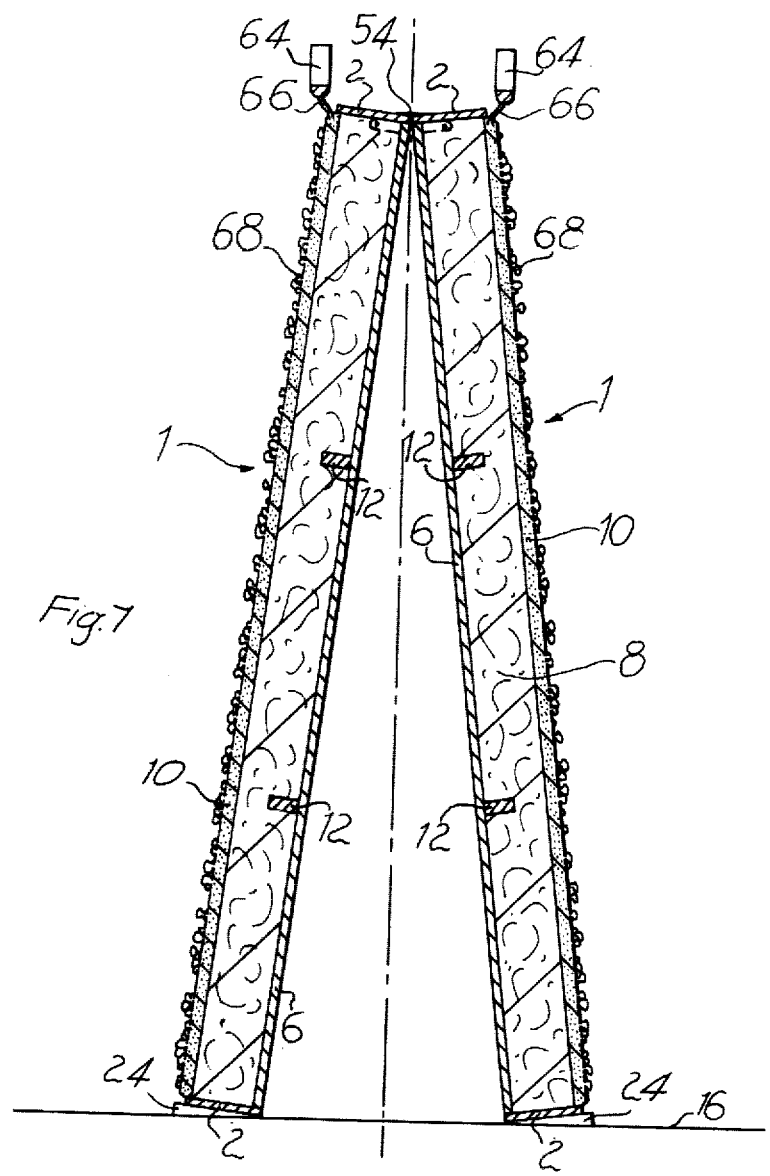

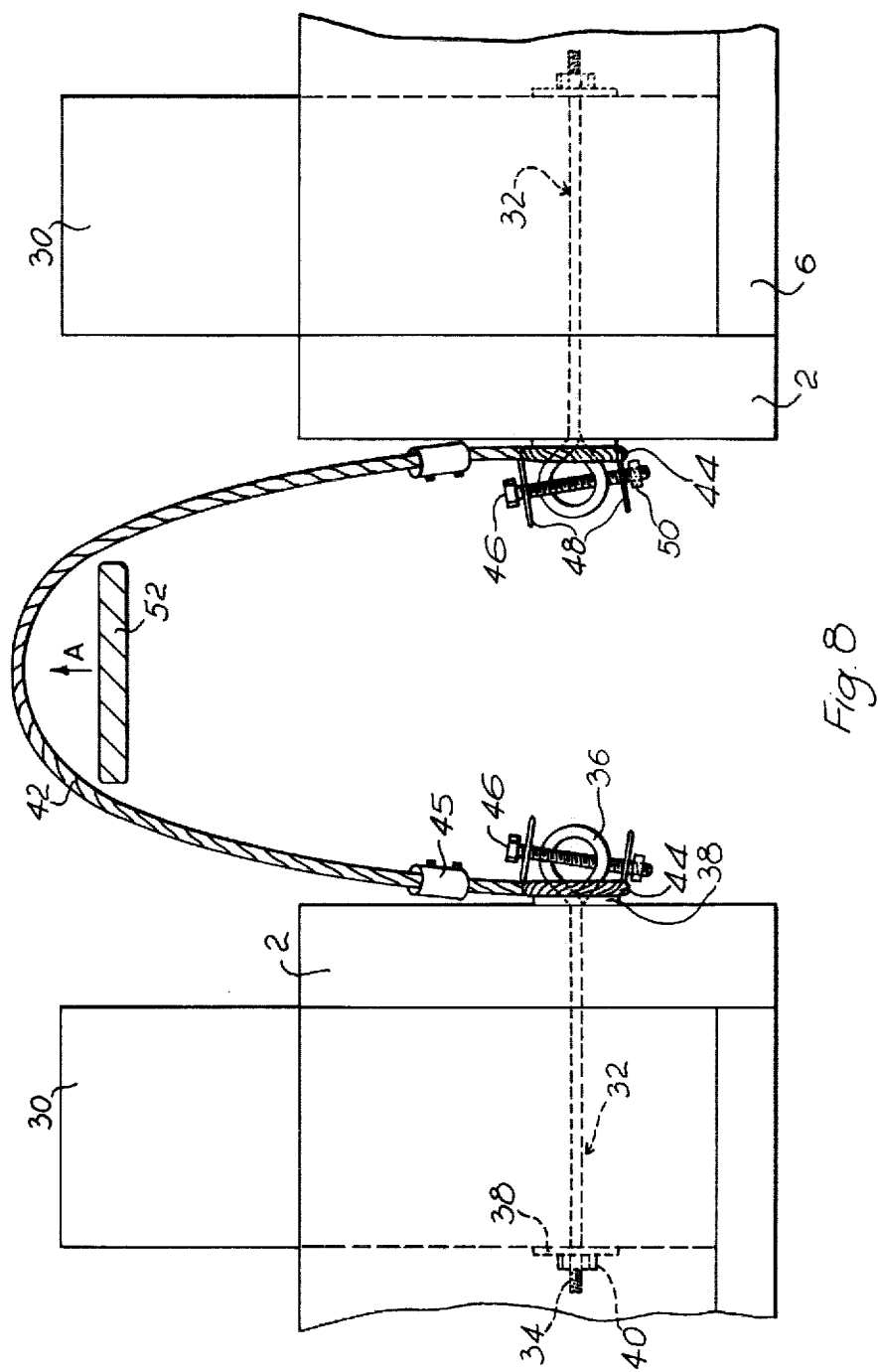

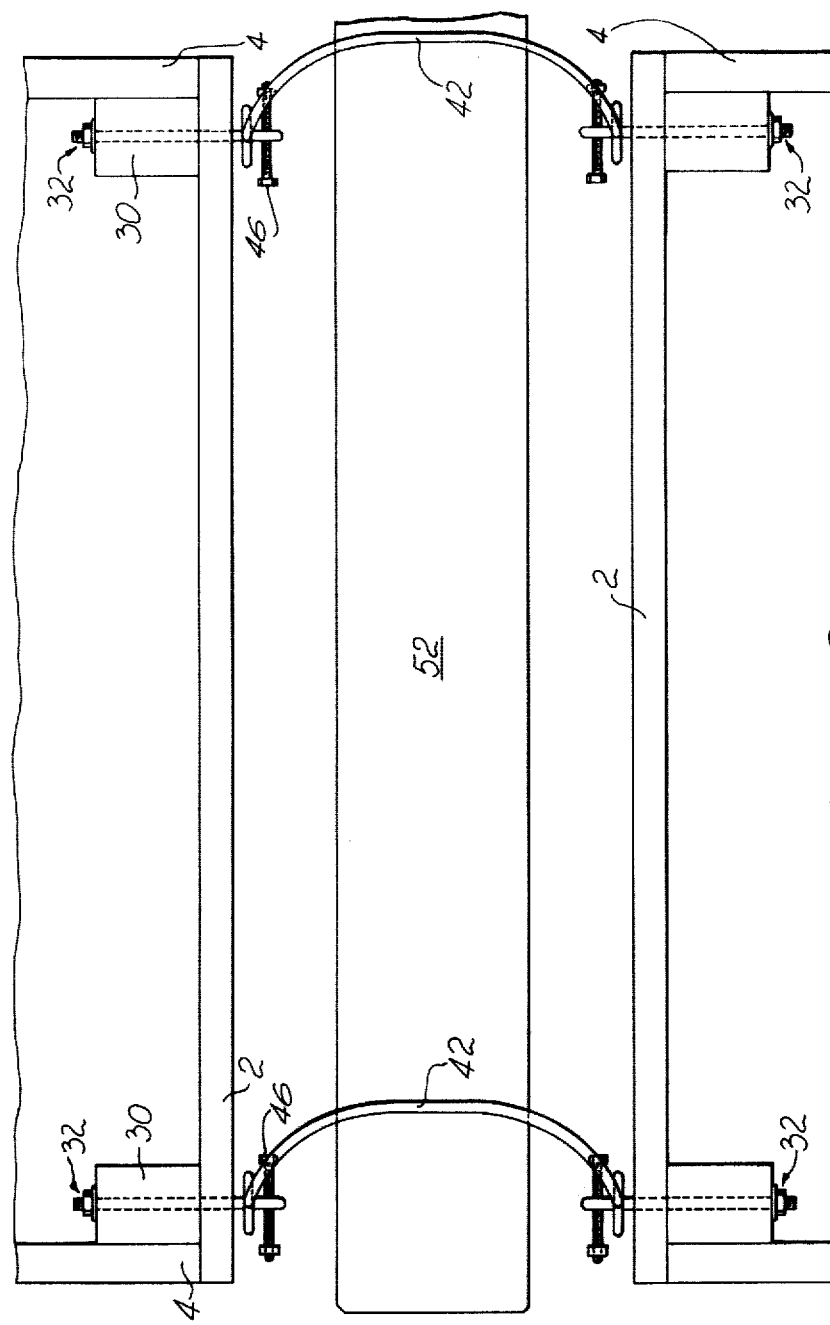

MUSHROOM GROWING

BACKGROUND OF THE INVENTION

1. Field of the Invention

This invention relates to mushroom growing and more especially to the commercial growing of cultivated mushrooms, that is the species agaricus bisporous and agaricus bitorquis, and any other edible fungi which are grown on a layer of casing medium over compost.

2. Description of the Prior Art

Cultivated mushrooms are usually grown on large trays containing compost covered with a layer of casing medium, the trays being mounted horizontally in growing areas under controlled growing conditions while mycelium, which is mixed into the compost before the compost is packed into the trays, grows throughout the compost, and while mushrooms then grow on the horizontal surface of the layer of casing medium on the compost.

Throughout the growing process the top surface of the casing medium has to be watered, usually by a spray and this wets the mushroom caps as they grow. This wetting can lead to bacterial blotch disease. Mushrooms are gathered selectively by pickers who lean over the trays and cut selected mushrooms and convey them by hand into boxes at the sides of the trays. Some of the caps necessarily become damaged during the picking operation.

In order to find the solution to the problem of avoiding wetting the mushroom caps as they grow, and to minimise the handling of the mushrooms as they are picked; ways of growing mushrooms have been sought in which the mushroom caps are kept dry and damage to the mushroom caps during picking is reduced.

SUMMARY OF THE INVENTION

It has now been found that the commercial cultivated mushroom species will grow off a near-vertical surface of growing medium, and it is a main object of the present invention to exploit this discovery and thereby overcome the problems of wetting the mushroom caps during watering and the problem of damage to the mushrooms during picking.

The invention provides a method of growing mushrooms comprising filling a tray with compost mixed with mushroom spawn, covering the compost with a layer of casing medium, supporting the tray in a horizontal disposition under growing conditions until the mycelium of the spawn has fully colonized the casing medium which is thereby consolidated, and then supporting the tray in an upright disposition under mushroom growing conditions so that the mushrooms grow from the upright face of the consolidated casing medium.

The method preferably also includes watering the casing medium by capillary action or by trickle feed to the region of the top edge of the casing medium when the tray is upright. This means that adequate watering can be provided to the whole of the layer of casing medium from which the mushrooms grow, without application of water to the mushroom caps while they are growing.

The mushrooms are preferably selectively harvested by cutting them with a vibratory tool having a cutting edge which vibrates in the direction of advance of the tool, and then allowing the cut mushroom to fall into a container. This means that the cut mushrooms do not have to be touched by the picker and the only damage which they might sustain is during their fall into a container such as a packing box which is held beneath mushrooms as they are cut.

The invention also comprehends apparatus for growing mushrooms, which apparatus comprises a tray for containing compost covered with a layer of casing medium, a rotationally secure support member against which the tray may be supported in an upright disposition, and watering means for watering the casing medium layer on the compost in the tray whilst the tray is upright.

Preferably, the support member comprises substantially T-shaped stanchion, an upright forming part of the stanchion being of polygonal cross-section, the apparatus further comprising a socket which is of complementary polygonal cross-section for receiving the upright and which is for disposition in the floor of a mushroom growing area.

Advantageously, the apparatus comprises two trays supported in upright dispositions back-to-back by the support member and further comprising one or more clips each releasably interconnecting the two trays, whereby the trays are secured against inadvertent displacement from their upright dispositions.

The invention further includes apparatus for growing mushrooms, which apparatus comprises two trays for containing compost covered with a layer of casing medium, hinge means connecting adjacent edges of the trays and adapted for raising the trays to an upright disposition, and watering means to water the layer of casing medium on the compost in each tray whilst the trays are upright.

The hinge means may comprise cables releasably secured between the adjacent edges of the trays.

Preferably each cable has end loops which are releasably secured to eye bolts fixed in the adjacent edges of the trays.

The watering means may comprise a water container and plurality of wicks disposed in the or each casing medium layer, the wicks extending substantially the length of the or each tray and terminating in the water container. The water container may be disposed adjacent the upper edge of the or each tray. Alternatively, the watering means may comprise conduit means for water extending along the upper edge or edges of the tray or trays and fine bore tubes leading from the conduit means to the casing layer of the or each tray.

BRIEF DESCRIPTION OF THE DRAWINGS

Some embodiments of the invention will now be described, by way of example, with reference to the accompanying drawings, in which:

FIG. 1 is a vertical section through two mushroom growing trays which are leaning in an upright disposition against a stanchion shown in end elevation;

FIG. 2 is a plan view of the stanchion of FIG. 1;

FIG. 3 is a side elevation of the stanchion of FIGS. 1 and 2;

FIG. 4 is a side elevation of a tray side clip;

FIGS. 5 and 6 show side and top elevations respectively of a tray top clip;

FIG. 7 is a vertical section through two mushroom growing trays which are supported against each other in an upright disposition according to a further embodiment of the invention and are hinged together at the top and wedged at the bottom.

FIG. 8 is a vertical section through adjacent ends of two mushrooms growing trays according to the embodiment of FIG. 7, but arranged horizontally and showing cable hinges used for lifting the trays;

FIG. 9 is a plan view of the trays of FIG. 8 and the cable hinges;

FIG. 11 is a diagrammatic view of a harvesting tool for selectively harvesting mushrooms from the trays of FIG. 1 or FIG. 7.

DESCRIPTION OF THE PREFERRED EMBODIMENTS

Figure 10:
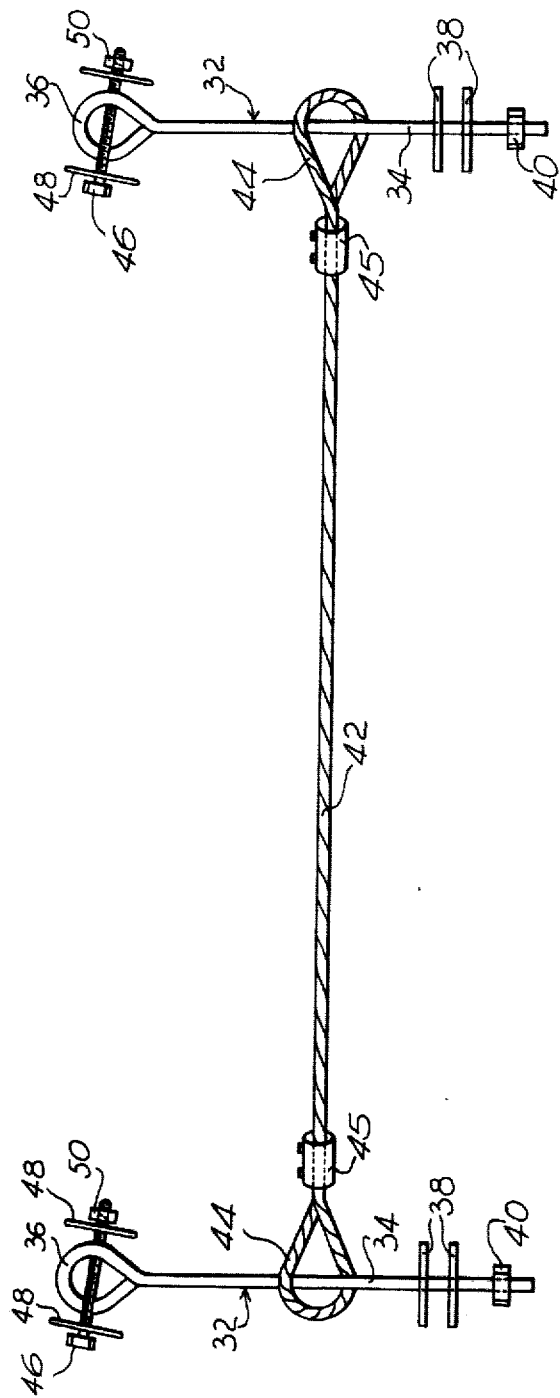
FIG. 10 shows a cable of FIG. 9 and means for releasably securing the cable to the adjacent ends of the trays.

FIG. 1 illustrates two mushroom growing trays 1 each comprising end members 2, side members 4 (FIG. 9) and a slatted bottom 6. These trays are of the size usually employed in commercial mushroom growing for example 2 m × 1.5 m.

Initially each tray is supported in a horizontal disposition and is filled with compost 8 which has been mixed, after pasteurisation, with mushroom spawn. The compost is covered with a layer 10 of casing medium, usually fine soil, in well known manner. Each tray is then supported in its horizontal disposition under growing conditions until the mycelium of the spawn has fully colonized the layer 10 of casing medium, which casing layer is thereby consolidated. Compost supports 12 are fixed to the tray bottom, parallel to the end members 2 of the tray and spaced one-third and two-thirds of the tray length. Each support 12 extends into the compost by a distance of one-third to two-thirds of the depth of the tray and assists in keeping the compost in place when the tray is upright.

When the casing is fully consolidated, the tray can be supported in an upright disposition, each tray being gripped by a fork-lift truck having a rotary head attachment. The tray is turned to be upright and leaned against a removable stanchion 14 mounted against rotation in a hole in the floor 16 of the mushroom growing area.

The stanchion is illustrated in FIGS. 1, 2 & 3. It is generally T-shaped and includes an upright 18 of square cross-section and a cross-bar 20. By inserting the free end of the upright 18 in a socket 22 in the floor 16 of the mushroom growing area, the socket being of a square cross-section and of a size to receive snugly the end of the upright, the stanchion is removably, but irrotatably, mounted in the floor. The trays may be supported singly against the cross-piece 20, or, as illustrated in FIG. 1, supported in pairs back-to-back against the cross-piece.

To stabilise the trays 1, wedges 24 may be inserted between the lower end member 2 of each tray and the floor 16 of the mushroom growing area.

To secure the trays against being inadvertently displaced from their upright position, clips 26, 28 (FIGS. 4, 5 & 6) may be releasably attached to a pair of back-to-back trays, in addition to, or instead of, using the wedges 24. One or more side clips (FIG. 4) may each be clipped to a side member 4 of each of the pair of trays, while one or more top clips 28 are pushed over the upper end member 2 of each tray of the pair. The clips are made of spring steel or other suitable material.

Instead of rotating the trays once layers 10 are consolidated, using a fork-lift truck with a rotary head, and supporting them against stanchions 14, an ordinary tined fork-lift truck may be used to lift two trays at a time, the trays being hinged together, in the way illustrated in FIGS. 7 to 10. The trays thus lifted are propped against each other and no stanchions are used.

FIGS. 8 and 9 show adjacent ends of two horizontally disposed mushroom growing trays 1. The trays have corner pegs 30, through each of which a threaded eye bolt 32 is passed. Each bolt 32 has a threaded shank 34 and an eye 36. Each bolt is, for example, approximately 0.2 m long, and is held in place on the tray by means of washers 38 and a nut 40.

FIG. 9 shows how adjacent end members 2 of two trays are provided on either side with such eye bolts 32. At each side of the trays, a steel cable 42, approximately 6 mm diameter and 0.7 m long, is secured to opposite eye bolts 32. Each cable has loops 44 at its ends, which loops are strenghtened by clamping collars 45. The loops 44 are passed over the eyes 36 of the bolts 32. Each loop 44 is retained on its respective eye 36, by a securing bolt 46 which passes through the eye, and is retained in the eye 36, by means of washers 48 and a nut 50. When the casing layers 10 have become consolidated by mycelium growth, the trays are lifted in pairs to an upright disposition by inserting a tine 52 of a forklift truck under the two cables 42, as shown in FIG. 9, and then lifting the tine in the direction of arrow A in FIG. 8, until the trays 1 have been moved to the inclined upright position, such as is shown in FIG. 7. The cables 42 form a hinge and may be left in position. Alternatively the securing bolts 46 may be released, once the trays are in an upright disposition, and the cables 42 removed to leave the two trays resting against each other.

Instead of using cables 42 and bolts 32 and 46, the end members 2 of the trays may be simply interconnected by hinge plates 54, as shown in FIG. 7.

The casing layers 10 of the upright trays are watered by an arrangement shown in FIG. 1. A support member 56 rests on the upper end members 2 of the pair of trays, and serves to support one or more water containers 58. Several wicks 60 are embedded in each casing layer 10, each wick extending substantially the full length of the tray. The wicks are most easily put in position by lying them in the casing medium when the casing medium layer 10 is being spread over the compost 8. End portions 62 of the wicks protrude from the upper end of the layers 10 and are inserted in the water containers 58, to supply water to their respective layers 10 by capillary action.

An alternative arrangement for watering the casing medium layers 10 is shown in FIG. 7. Watering conduits, shown as gutters 64 are mounted near the upper end members 2 of the trays and each gutter 64 is connected by fine bore tubes 66 to the region of the top edge of the casing layer 10. The casing layer is thus watered by trickle feed and the rate of feed is sufficient to provide the required watering which permeates down the consolidated casing layer during the whole mushroom growing period. The conduit means may instead be pipes to which the fine bore tubes 66 are connected.

The mushrooms, indicated at 68 grow out and slightly upwardly from the near-vertical face of the consolidated casing layer 10 of each tray. During growing the correct amount of water is provided either by capillary action of the wicks 60 or by the trickle feed without any risk of water contaminating the mushroom caps as they grow. Air circulates through the space between the slatted bottoms 6 of the trays so that surplus heat is easily removed. There is also good circulation over the mushrooms as they grow and because the caps are kept dry as the mushrooms grow the risk of bacterial blotch disease is minimised. The labour necessary for watering is considerably reduced and floor space is saved. Furthermore, the good supply of water to the mushrooms maximises their water content and hence their weight.

The pickers do not have to lean across the trays as in the former method with the trays kept horizontal during growing but instead, by employing the method of the invention, the pickers can walk between the substantially vertically disposed trays and can pick selectively the mushroom stalks being cut with a knife and the mushrooms placed in containers. The mushrooms can alternatively be allowed to fall into the containers, which are usually the cardboard boxes in which the mushrooms are to be marketed, the boxes being held under the mushrooms to catch them as they fall so that the mushroom caps do not have to be handled by the picker. As well as leading to a considerable reduction in the damage to the mushrooms caused whilst they are picked, the method and apparatus of the invention renders all the mushrooms equally readily visible and accessible to the pickers, who can thus choose those mushrooms which are ready for harvesting.

Selective harvesting of the mushrooms may be facilitated by cutting them from the casing layer 10 with a vibratory tool of the kind illustrated in FIG. 11. The tool has a handle 70 which contains a small vibratory motor powered by an electric lead 72. The motor vibrates a plate 74 to and fro as indicated by the arrows 76. The plate carries at its furthest end a cutting blade 78 which has a cutting edge 80 which is not so sharp as to cut the fingers of the picker but, under the vibratory action in the direction of advance of the tool indicated by the arrow 76 the mushrooms can be cleanly cut selectively from the casing layer 10 without damage to the mushroom caps. The cut mushrooms fall a short distance into the container held under the mushrooms by the picker.

It has been found that the method of the invention can be practised with the tray supported in an upright position vertically or at a range of angles to the vertical, for example down to 45 degrees, as long as the angle at which the tray is supported, when related to the size of the tray, is not so great as to hinder the ease of access to the mushrooms which is achieved by the method of the invention. Because of the capillary or trickle feed for watering the casing, the mushrooms are cleaner and less subject to bacterial disease.

The trays do not have to be supported in pairs in either of the manners illustrated, but each tray may be shaped so that one side of the tray is longer than the opposite side and forms an extended foot on which the tray can stand with the mushroom-growing face of the casing layer at an angle to the vertical.

We claim:

1. A method of growing mushrooms comprising filling a horizontal tray with compost mixed with mushroom spawn, covering the compost with a layer of casing medium, supporting the tray in a horizontal disposition under growing conditions until the mycelium of the spawn has fully colonized the casing medium which is thereby consolidated, then supporting the tray on one end in a more generally vertical disposition under mushroom growing conditions so that the mushrooms grow from the upright face of the consolidated casing medium, and watering only the top edge of the casing medium.

2. A method according to claim 1, wherein the top edge of the casing medium is watered by capillary action.

3. A method according to claim 1, wherein the top edge of the casing medium is watered by trickle feed.

4. A method of growing mushrooms comprising filling a tray with compost mixed with mushroom spawn, covering the compost with a layer of a casing medium, supporting the tray in a horizontal disposition under growing conditions until the mycelium of the spawn has fully colonized the casing medium which is thereby consolidated, then supporting the tray on one end in a more generally vertical disposition under mushroom growing conditions so that the mushrooms grow from the upright face of the consolidated casing medium, and selectively harvesting the mushrooms by cutting them with a vibratory tool having a cutting edge which vibrates in the direction of advance of the tool and allowing the cut mushrooms to fall into a container.

5. Apparatus for growing mushrooms comprising a tray for containing compost covered with a layer of casing medium, a substantially T-shaped stanchion against which the tray may be supported in a generally vertical disposition, an upright forming part of the stanchion being of polygonal cross-section, a socket for disposition in the floor of a mushroom growing area which socket is of complementary polygonal cross-section for receiving said upright in rotationally secure manner, and watering means for watering the casing medium layer on the compost in the tray whilst the tray is in said disposition.

6. Apparatus according to claim 5, comprising two trays supported in upright dispositions back-to-back by the support member and further comprising one or more clips each releasably interconnecting the two trays, whereby the trays are secured against inadvertent displacement from their upright dispositions.

7. Apparatus according to claim 5, comprising two trays supported in upright dispositions back-to-back by the support member and further comprising one or more clips each releasably interconnecting the two trays, whereby the trays are secured against inadvertent displacement from their upright dispositions.

8. Apparatus according to claim 6 or 7, wherein the watering means comprise a water container and plurality of wicks disposed in the or each casing medium layer, the wicks extending substantially the length of the or each tray and terminating in the water container.

9. Apparatus according to claim 8, wherein the water container is disposed adjacent the upper edge of the or each tray.

10. Apparatus according to claim 8, wherein the watering means comprise conduit means for water extending along the upper edge or edges of the tray or trays and fine bore tubes leading from the conduit means to the layer of casing medium of the or each tray.

11. Apparatus for growing mushrooms comprising two trays for containing compost covered with a layer of casing medium, hinge means connecting adjacent edges of the trays and adapted to permit said hinged adjacent edges of the trays to be raised to bring the trays to a generally vertical disposition, and watering means to water the layer of casing medium on the compost in each tray whilst the trays are in said disposition, and means for maintaining said trays in said disposition.

12. Apparatus according to claim 11, wherein the hinge means comprises cables releasably secured between the adjacent edges of the trays.

13. Apparatus according to claim 12, wherein each cable has end loops which are releasably secured to eye bolts fixed in the adjacent edges of the trays.

14. Apparatus according to claim 12, 13 or 11 wherein the watering means comprise a water container and plurality of wicks disposed in the or each casing medium layer, the wicks extending substantially the length of the or each tray and terminating in the water container.

15. Apparatus according to claim 14, wherein the water container is disposed adjacent the upper edge of the or each tray.

16. Apparatus according to claim 12, 13 or 11, wherein the watering means comprises conduit means for water extending along the upper edge or edges of the tray or trays and fine bore tubes leading from the conduit means to the layer of casing medium of the or each tray.

* * * * *